United States Patent [19]

Miura et al.

[11] Patent Number: 4,722,242
[45] Date of Patent: Feb. 2, 1988

[54] AUTOMATIC TRANSMISSION

[75] Inventors: Masakatsu Miura, Kariya; Hideyuki Aoki, Anjo, both of Japan

[73] Assignee: Aisin-Warner Kabushiki Kaisha, Aichi, Japan

[21] Appl. No.: 833,379

[22] Filed: Feb. 26, 1986

[30] Foreign Application Priority Data

Oct. 16, 1985 [JP] Japan ............................ 60-230810

[51] Int. Cl.$^4$ .......... F16H 37/08/47/08; F16H 57/02
[52] U.S. Cl. ...................................... 74/695; 74/701; 74/688; 74/606 R
[58] Field of Search ............ 74/760, 767, 695, 606 R, 74/753, 701, 688

[56] References Cited

U.S. PATENT DOCUMENTS

| | | | |
|---|---|---|---|
| 3,279,573 | 10/1966 | Honsel | 112/87.11 |
| 3,355,966 | 12/1967 | Boehm | 74/688 |
| 3,359,827 | 12/1967 | Charman et al. | 74/688 X |
| 3,365,985 | 1/1968 | Johnson | 74/761 |
| 3,474,690 | 10/1969 | Lepelletier | 74/695 X |
| 3,746,138 | 7/1973 | Forster et al. | 192/87.11 |
| 3,747,727 | 7/1973 | Dach et al. | 192/87.11 X |
| 3,747,730 | 7/1973 | Hause | 192/87.11 |
| 3,877,320 | 4/1975 | Iijima | 74/753 X |
| 4,014,223 | 3/1977 | Pierce | 74/688 |
| 4,027,552 | 6/1977 | Muakami et al. | 74/753 X |
| 4,056,986 | 11/1977 | Hobbs | 74/701 X |
| 4,229,996 | 10/1980 | Hildebrand | 74/688 |
| 4,263,823 | 4/1981 | Numazawa et al. | 74/695 |
| 4,308,763 | 1/1982 | Brisabois | 74/606 R X |
| 4,315,443 | 2/1982 | Kubo et al. | 74/695 |
| 4,417,484 | 11/1983 | Gaus et al. | 74/688 |
| 4,480,499 | 11/1984 | Kubo et al. | 74/695 |
| 4,499,789 | 2/1985 | Kuramochi et al. | 74/606 R X |
| 4,499,791 | 2/1985 | Brisabois | 174/606 R X |
| 4,501,167 | 2/1985 | Saito | 74/606 R X |
| 4,592,250 | 6/1986 | Plasencia et al. | 74/688 |
| 4,607,541 | 8/1986 | Miura et al. | 74/753 X |
| 4,638,686 | 1/1987 | Lemieux et al. | 74/695 X |

FOREIGN PATENT DOCUMENTS

| | | | |
|---|---|---|---|
| 0041730 | 12/1981 | European Pat. Off. | |
| 766355 | 8/1964 | United Kingdom | 192/87.11 |
| 1256988 | 12/1971 | United Kingdom | 04001968/GBX |
| 1445515 | 8/1976 | United Kingdom. | |
| 1525593 | 9/1978 | United Kingdom. | |
| 2030246 | 4/1980 | United Kingdom. | |
| 2132289 | 7/1984 | United Kingdom | 74/695 |

Primary Examiner—Dirk Wright
Attorney, Agent, or Firm—Wenderoth, Lind & Ponack

[57] ABSTRACT

A plurality of clutches are disposed at one place in the automatic transmission of the present invention to form a clutch portion, the clutch portion is disposed at a front end portion of the automatic transmission mechanism portion, an annexed transmission part is disposed at a position adjacent to the automatic transmission mechanism portion, and the annexed transmission part is provided with a counter gear which is actuated by an output member of the automatic transmission mechanism portion and is detachably attached with a sub-transmission unit. When the transmission is assembled, a multi-transmission stage can be obtained by modifying the clutch portion, and attaching/detaching the sub-transmission unit.

10 Claims, 11 Drawing Figures

FIG. 2

3 speed

| | 3 speed A/T part 10, | | | | | | | annexed transmission part 20, | | |
|---|---|---|---|---|---|---|---|---|---|---|
| | $C_1$ | $C_2$ | | $B_1$ | $B_2$ | $B_3$ | $F_1$ | $F_2$ | | |
| P | | | | | | | | | | |
| R | | ○ | | | | ○ | | | | |
| N | | | | | | | | | | |
| D 1 | ○ | | | | | | | ○ | | |
| D 2 | ○ | | | | ○ | | ○ | | | |
| D 3 | ○ | ○ | | | ○ | | | | | |
| 2 1 | ○ | | | | | | | ○ | | |
| 2 2 | ○ | | | ○ | ○ | | ○ | | | |
| 1 1 | ○ | | | | | ○ | | ○ | | |

FIG. 4

4 speed (U/D)

| | | 3 speed A/T part $10_1$ | | | | | | | | annexed transmission part $20_2$ | | |
|---|---|---|---|---|---|---|---|---|---|---|---|---|
| | | $C_1$ | $C_2$ | $C_0$ | $B_1$ | $B_2$ | $B_3$ | $F_1$ | $F_2$ | $F_0$ | $C_3$ | $B_4$ | $F_3$ |
| | P | | | | | | | | | | | ○ | |
| | R | | ○ | | | | ○ | | | | | ○ | |
| | N | | | | | | | | | | | ○ | |
| D | 1 | ○ | | | | | | ○ | | | | ○ | ○ |
| D | 2 | ○ | | | | ○ | | ○ | | | | ○ | ○ |
| D | 3 | ○ | | | | ○ | | ○ | | | ○ | | |
| D | 4 | ○ | ○ | | | (○) | | | | | ○ | | |
| 3 | 1 | ○ | | | | | | ○ | | | | ○ | ○ |
| 3 | 2 | ○ | | | | ○ | | ○ | | | | ○ | ○ |
| 3 | 3 | ○ | ○ | | | (○) | | | | | | ○ | ○ |
| 2 | 1 | ○ | | | | | | ○ | | | | ○ | ○ |
| 2 | 2 | ○ | | | ○ | ○ | | ○ | | | | ○ | ○ |
| 1 | 1 | ○ | | | | | ○ | | ○ | | | ○ | ○ |

FIG. 6

4 speed (O/D)

| | | 4 speed A/T part 10₂ | | | | | | | | annexed transmission part 20₁ | | |
|---|---|---|---|---|---|---|---|---|---|---|---|---|
| | | $C_1$ | $C_2$ | $C_0$ | $B_1$ | $B_2$ | $B_3$ | $F_1$ | $F_2$ | $F_0$ | | |
| P R N | | | ○ | | | ○ | | | | | | |
| D | 1 | ○ | | | | | | ○ | | | | |
| D | 2 | ○ | | | | ○ | | ○ | | | | |
| D | 3 | ○ | | ○ | | ◌ | | | | ⊙ | | |
| D | 4 | | | ○ | ○ | ◌ | | ◌ | | | | |
| 3 | 1 | ○ | | | | | | ○ | | | | |
| 3 | 2 | ○ | | | | ○ | | ○ | | | | |
| 3 | 3 | ○ | | ○ | | ◌ | | | | ⊙ | | |
| 2 | 1 | ○ | | | | | | ○ | | | | |
| 2 | 2 | ○ | | | ○ | ○ | | ○ | | | | |
| 1 | 1 | ○ | | | | | ○ | ○ | | | | |

FIG. 8

5 speed

| | | 4 speed A/T part $10_2$ | | | | | | | | | annexed transmission part $20$ | | |
|---|---|---|---|---|---|---|---|---|---|---|---|---|---|
| | | $C_1$ | $C_2$ | $C_0$ | $B_1$ | $B_2$ | $B_3$ | $F_1$ | $F_2$ | $F_0$ | $C_3$ | $B_4$ | $F_3$ |
| P | | | | | | | | | | | | ○ | |
| R | | | ○ | | | ○ | | | | | | ○ | |
| N | | | | | | | | | | | | ○ | |
| D | 1 | ○ | | | | | | | ○ | | | ○ | ○ |
| D | 2 | ○ | | | | ○ | | ○ | | | | ○ | ○ |
| D | 3 | ○ | | | | ○ | | ○ | | | ○ | | |
| D | 4 | ○ | | ○ | | ◌ | | | | ⊙ | ○ | | |
| D | 5 | | ○ | ○ | ◌ | | | ◌ | | | ○ | | |
| 4 | 1 | ○ | | | | | | | ○ | | | ○ | ○ |
| 4 | 2 | ○ | | | | ○ | | ○ | | | | ○ | ○ |
| 4 | 3 | ○ | | ○ | | ◌ | | | | ⊙ | | ○ | ○ |
| 4 | 4 | ○ | | ○ | | ◌ | | | | ⊙ | ○ | | |
| 2 | 1 | ○ | | | | | | | ○ | | | ○ | ○ |
| 2 | 2 | ○ | | | ○ | ○ | | ○ | | | | ○ | ○ |
| 1 | 1 | ○ | | | | | ○ | | ○ | | | ○ | ○ |

FIG. 9

6 speed

| | | 4 speed A/T part $10_2$ | | | | | | | | annexed transmission part $20_2$ | | |
|---|---|---|---|---|---|---|---|---|---|---|---|---|
| | | $C_1$ | $C_2$ | $C_0$ | $B_1$ | $B_2$ | $B_3$ | $F_1$ | $F_2$ | $F_0$ | $C_3$ | $B_4$ | $F_3$ |
| | P | | | | | | | | | | O | | |
| | R | | O | | | | O | | | | O | | |
| | N | | | | | | | | | | O | | |
| D | 1 | O | | | | | | | O | | | O | O |
| D | 2 | O | | | | | | | O | | | | O |
| D | 3 | O | | | | O | | O | | | | O | O |
| D | 4 | O | | | | O | | O | | | | O | |
| D | 5 | O | | O | | (O) | | | | ● | O | | |
| D | 6 | | O | O | | (O) | | | (O) | | O | | |
| 5 | 1 | O | | | | | | | O | | | O | O |
| 5 | 2 | O | | | | | | | O | | | | O |
| 5 | 3 | O | | | | O | | O | | | | O | O |
| 5 | 4 | O | | O | | (O) | | | | ● | | O | O |
| 5 | 5 | O | | O | | (O) | | | | ● | O | | |
| 2 | 1 | O | | | | | | | O | | | O | O |
| 2 | 2 | O | | | | | O | | O | | | | O |
| 1 | 1 | O | | | | | O | | O | | | O | O |

AUTOMATIC TRANSMISSION

BACKGROUND OF THE INVENTION

1. Field of the Invention

This invention relates to an automatic transmission, particularly to an automatic transmission for an automobile which is used together with a torque converter, and more particularly to an automatic transmission which can be easily modified to comprise a transmission stage or a multitransmission stage.

2. Description of the Related Art

Heretofore, a four speed automatic transmission mechanism employs a three speed automatic transmission mechanism including two planetary gear units as a base, and an additional overdrive (O/D) mechanism attached thereto or underdrive (U/D) mechanism comprising a planetary gear unit in order to obtain a transmission stage having four foward speeds.

In recent years, in view of ever growing of F F (front engine front drive), high horse power, etc. for vehicles for example, the automatic transmission is required to be much smaller. In addition, the transmitting torque capacity is required to be larger. However, the conventional four speed automatic transmission mechanism including the two planetary gear units attached with the aforementioned O/D mechanism, etc. can not meet the above mentioned requirements.

Under the circumstances, there is an automatic transmission mechanism which additionally has two clutches attached to the conventional so-called Simpson type planetary gear unit for obtaining four speeds proposed in Japanese Patent Laid-open Application No. 59(1984)-183147. That is, the mechanism of the automatic transmission is constituted such that a third clutch is disposed between the sun gear of the first planetary gear unit and the sun gear of the second planetary gear unit which are integrally connected with respect to each other in the conventional Simpson type. At the same time, the sun gear of the first gear unit communicates with the carrier of the second gear unit through a fourth clutch, the third clutch is disengaged to separate the first gear unit from the second gear unit, the fourth clutch is connected in order to transfer input to the carrier of the second gear unit, and at the same time, the sun gear of the second gear unit is fixed to output an overdrive from the ring gear to obtain a fourth speed in addition to three speeds.

On the other hand, in recent years, because many kinds of vehicles are produced and a wide variety of attachments ae made available for one kind of vehicle, various kinds of automatic transmissions are required to be produced. And, there is a tendency to produce many kinds of automatic transmissions but each only in a small quantity. By the way, the four speed automatic transmission apparatus attached with the O/D mechanism or U/D mechanism is entirely different from an apparatus comprising a three speed automatic transmission mechanism in its outer configuration. Accordingly, the whole transaxle case is required to be made differently. This means that although the three speed automatic transmission mechanism is same, it is required to be assembled on an entirely different line. Also, in the four speed automatic transmission which is an improvement of the aforementioned Simpson type, both the sun gears are separated and a clutch is interposed therebetween. Accordingly, all parts including the casing must be constituted differently from the conventional three speed Simpson type, and the three speed automatic transmission and four speed automatic transmission must be manufactured separately. Due to the foregoing, common use of parts and of an assembly line are difficult to attain, and small production of many kinds of parts often invites a significant increase in cost, thus the requirements of recent time demands for various kinds of vehicles and wide variations thereof are unable to be met.

Further, due to the diversity of needs and the demand for decrease of fuel cost in recent times, the appearance of a transmission having many more transmission stages is awaited. Any attempt to cope with the demand for a multitransmission stage results in an extremely large amount of equipment investment.

SUMMARY OF THE INVENTION

It is therefore an object of the present invention to provide an automatic transmission, wherein most of the parts are commonly used and replaceable parts are changed at one place, so that minor modification can be used to obtain many kinds of transmission stages.

That is, the present invention is constituted such that a plurality of clutches are put together to form a clutch portion, the clutch portion is disposed at a front end portion of an automatic transmission mechanism portion, an annexed transmission part is disposed at a position adjacent to the automatic transmission mechanism portion, the annexed transmission part is provided with a counter gear which is actuated in association with an output member of the automatic transmission mechanism portion, a sub-transmission unit is detachably attached to the annexed transmission part, and a multitransmission stage is obtainable by modifying the clutch portion and attaching/detaching the subtransmission unit.

Due to the foregoing, the automatic transmission mechanism portion of the present invention includes a single planetary gear unit and a dual planetary gear unit, carriers and sun gears of both the planetary gear units being integrally connected with respect to each other. Accordingly, the transmission is compact, a problem of limited installation space due to F F, etc. can be adequately coped with, and a problem arising from the loading on vehicles can be overcome. Furthermore, a plurality of clutches $C_1$, $C_2$ and $(C_o)$ of the automatic transmission mechanism portion 10 are put together at one place to form a clutch portion 6, 6', and the clutch portion is disposed at the front end portion of the automatic transmission mechanical portion $10_1$ and $10_2$ so that the transmission can be easily shifted. In addition, the annexed transmission part 20 is detachably attached with a sub-transmission unit 22. Accordingly, many automatic transmissions $1_1$ through $1_5$ having different transmission stages can be obtained by making minor modifications. Thus, the present invention can adequately meet the needs of many vehicles. At the same time, manufacturing equipment and parts can be commonly used. Thus, small quantity production which is required when producing many kinds of vehicles can be facilitated without increasing the cost.

BRIEF DESCRIPTION OF THE DRAWINGS

FIG. 2 is an illustration showing the actuating state of the respective elements thereof;

FIG. 4 is an illustration showing the actuating state of the respective elements thereof;

FIG. 6 is an illustration showing the actuating state of the respective elements thereof;

FIG. 8 is an illustration showing the actuating state of the respective elements thereof when five forward speeds are provided;

FIG. 9 is an illustration showing the actuating state of the respective elements thereof when six forward speeds are provided;

DESCRIPTION OF THE PREFERRED EMBODIMENT

Figure 1:
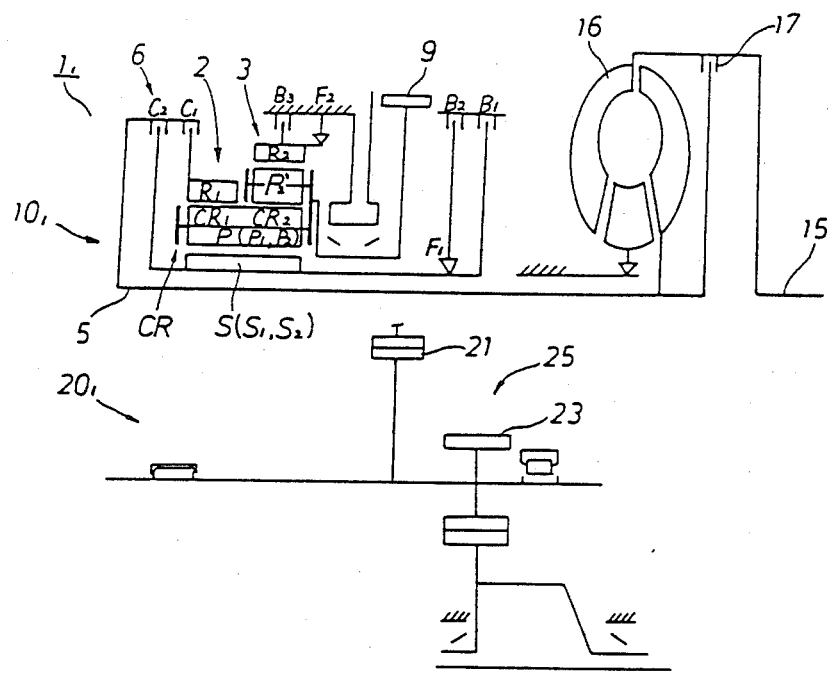
FIG. 1 is a schematic view showing a forward three speed stage automatic transmission comprising a three speed automatic transmission mechanism portion and an annexed transmission part with a reduction gear.

An automatic transmission 1, as shown in FIGS. 1 through 5, includes automatic transmission mechanism portions $10_1$ and $10_2$ comprising a single planetary gear unit 2 and a dual planetary gear unit 3, carriers CR ($CR_1$ and $CR_2$) and sun gears S ($S_1$ and $S_2$) of both the planetary gear units 2 and 3 which are integrally connected with respect to each other, predetermined elements $R_1$, S and ($R_2$) of both the planetary gear units 2 and 3 being connected to an input member 5 through clutches $C_1$, $C_2$ and ($C_o$) respectively, the predetermined elements S and $R_2$ being retained by retaining means such as one-way clutches $F_1$, one-way brake $F_2$ and ($F_o$), and brakes $B_1$, $B_2$, $B_3$.

Figure 10:
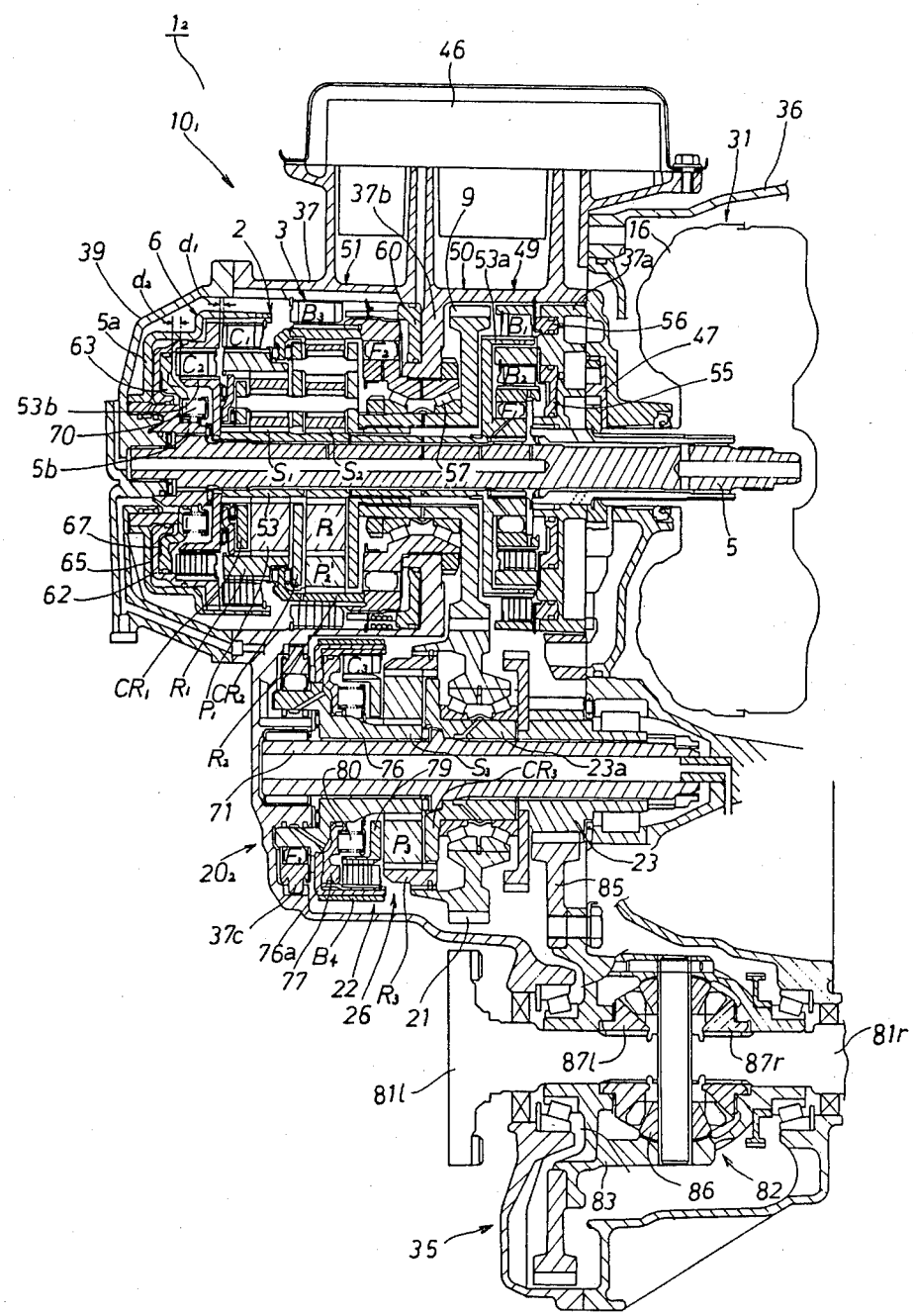
FIG. 10 is a sectional view showing one embodiment of an automatic transmission according to the present invention.
Figure 11:
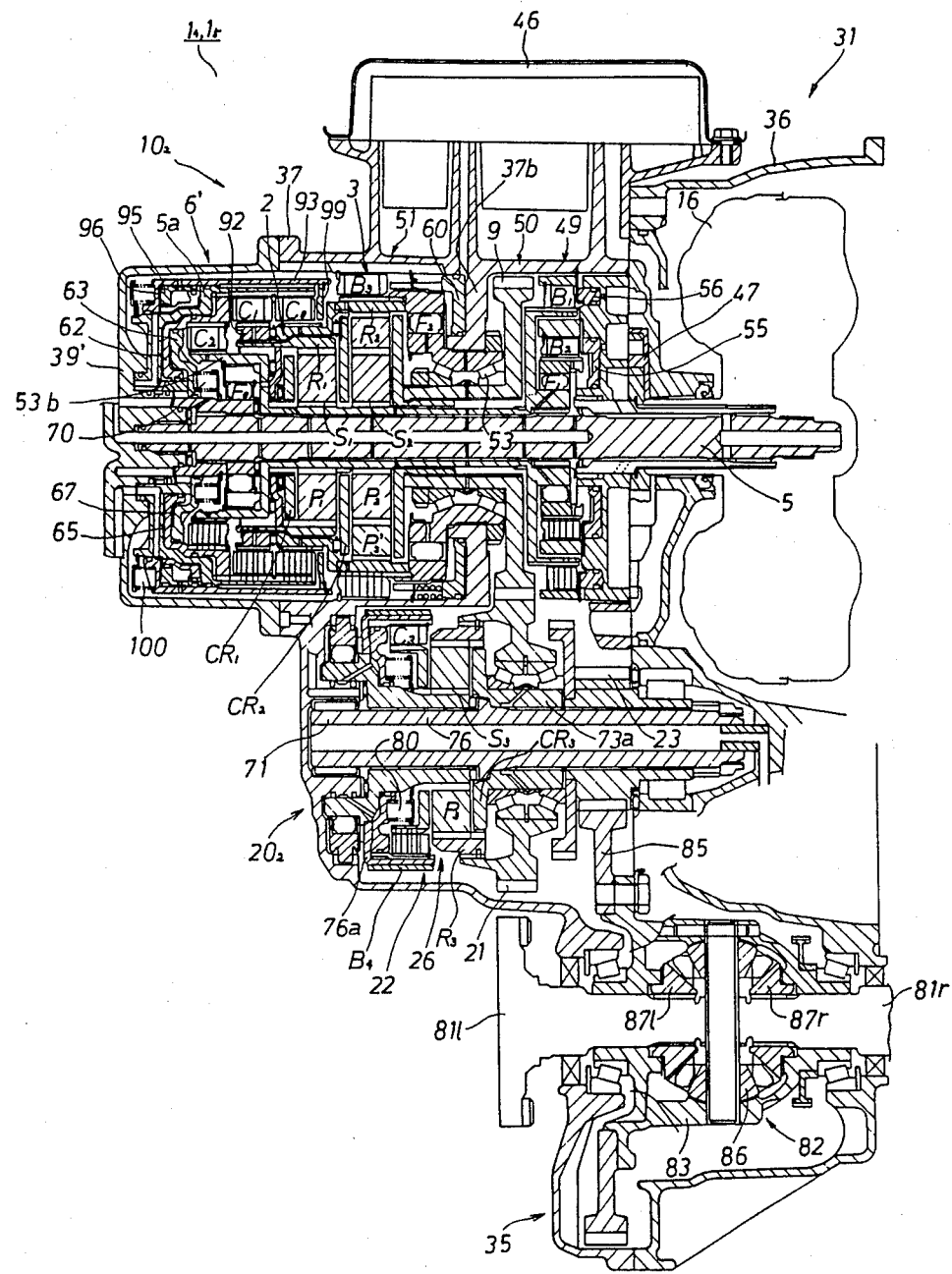
FIG. 11 is a sectional view showing another embodiment.

And, the plurality of clutches $C_1$, $C_2$ and ($C_o$) are put together at one place to form clutch portions 6 and 6'. The clutch portions, as shown in FIGS. 10 and 11, are disposed at a front end portion of the automatic transmission mechanism portions $10_1$ and $10_2$. Annexed transmission parts $20_1$ and $20_2$ are disposed at positions adjacent to the automatic transmission mechanism portions $10_1$ and $10_2$. The annexed transmission part includes a counter gear 21 which is actuated in association with an output member 9 of the automatic transmission mechanism portions $10_1$ and $10_2$ and is detachably attached with a sub-transmission unit 22. And, the automatic transmissions $1_1$ through $1_5$ obtain a number of transmission stages or a multitransmission stage by alteration of the clutch portions 6 and 6' and attachment or detachment of the sub-transmission unit 22.

More particularly, the automatic transmission mechanism portion 10 is changed between a three speed automatic transmission mechanism portion $10_1$ and a four speed automatic transmission mechanism portion $10_2$ by changing the clutch portions 6 and 6'. Similarly, the annexed transmission part 20 is changed between a two speed direct connection and underdrive (U/D) by attaching the sub-transmission unit 22 and a simple reduction gear 25 by detaching the sub-transmission unit. A multitransmission stage is obtained through combination of the automatic transmission mechanism portion and the annexed transmission part.

Figure 3:
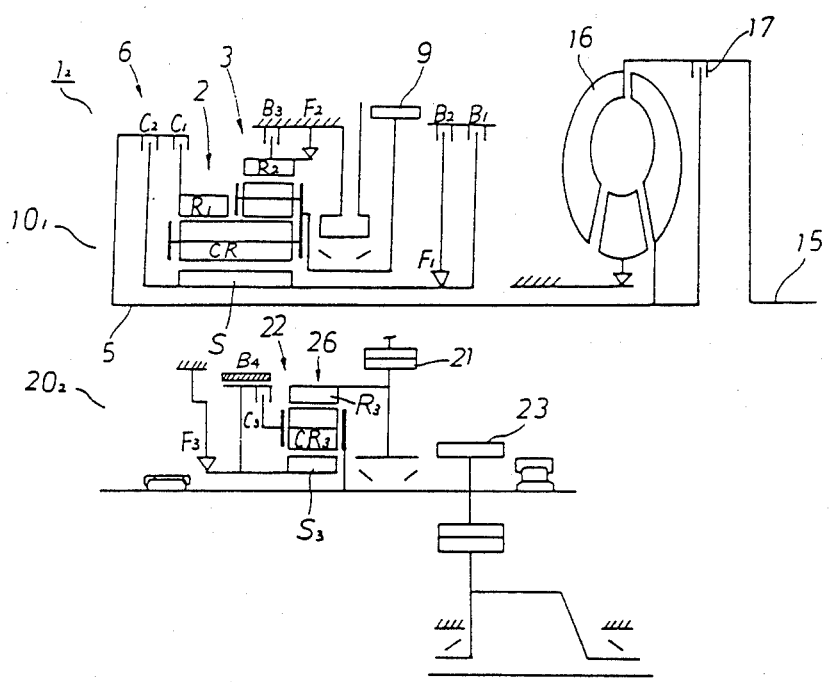
FIG. 3 is a schematic view showing a forward four speed stage automatic transmission comprising a three speed automatic transmission mechanism portion and an annexed transmission part including a sub-transmission unit.

In the three speed automatic transmission mechanism $10_1$, as shown in FIGS. 1 and 3, the input member 5 connected from an engine output shaft 15 through a torque converter 16 or a lock-up clutch 17 is connected to a ring gear $R_1$ of the single planetary gear unit 2 through a first clutch $C_1$ and also to the sun gears S through a second clutch $C_2$. The sun gear S is directly braked by the first brake $B_1$ and is restricted to unidirectional rotation by the second brake $B_2$ through a first one-way clutch $F_1$. A ring gear $R_2$ of the dual planetary gear unit 3 is directly braked by a third brake $B_3$ and is restricted to unidirectional rotation by a one-way brake $F_2$. The carrier C is connected to the output member 9.

Figure 5:
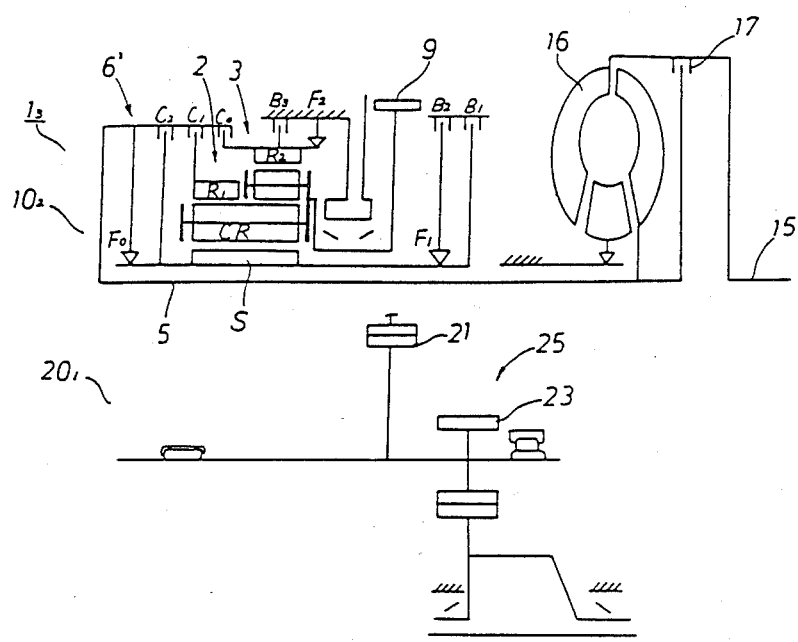
FIG. 5 is a schematic view showing a forward four speed stage transmission comprising a four speed automatic transmission mechanism portion and an annexed transmission part with a reduction gear.
Figure 7:
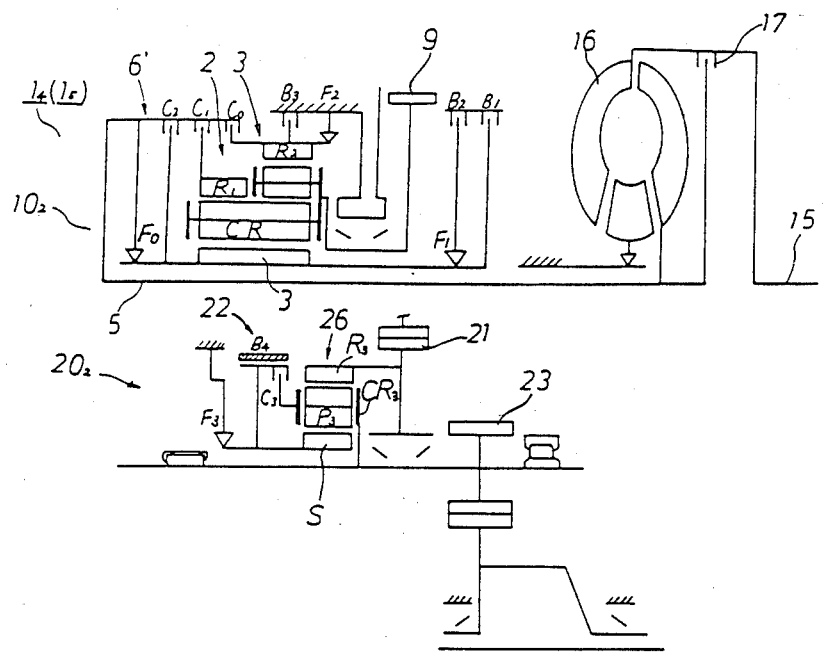
FIG. 7 is an illustration showing a forward five and six speed automatic transmission comprising a four speed automatic transmission mechanism portion and an annexed transmission part including a sub-transmission unit.

In the four speed automatic transmission mechanism $10_2$, as shown in FIGS. 5 and 7, the input member 5 is connected to the ring gear $R_2$ of the dual planetary gear unit 3 through a third clutch $C_o$ which is added to the three speed automatic transmission mechanism $10_1$. Interposed between the input member 5 and the sun gear S is a third one-way clutch $F_o$ adapted to restrict rotation of the sun gear S so as not to exceed rotation of the input member 5.

On the other hand, the annexed transmission parts $20_1$, as shown in FIGS. 1 and 5, comprise a simple reduction gear 25 formed by a counter (driven) gear 21 and a (differential drive) pinion 23 integrally formed with respect to each other. Additionally, the annexed transmission parts $20_2$, as shown in FIGS. 3 and 7, comprise a sub-transmission unit 22. The sub-transmission unit 22 comprises a single planetary unit 26. A ring gear $R_3$ of the single planetary unit 26 is connected to a counter gear 21. A carrier $CR_3$ is connected to an output pinion 23. The sun gear $S_3$ is restricted to unidirectional rotation by a one-way brake $F_3$, braked by a fourth brake $B_4$ and connected to a carrier $CR_3$ through a fourth clutch $C_3$.

Due to the foregoing constitution, as shown in FIG. 1, a three speed stage automatic transmission $1_1$ is obtained through combination of a three speed automatic transmission mechanism portion $10_1$ and an annexed transmission part $20_1$ comprising a reduction gear 25. And, the automatic transmission $1_1$ is operated according to the operation table shown in FIG. 2.

That is, in the first speed state of D range, the second (forward) clutch $C_1$ is connected. Then, rotation of the input member (shaft) 5 is transmitted to the ring gear $R_1$ of the single unit 2 through the clutch $C_1$. Since the ring gear $R_2$ of the dual unit 3 is prevented from rotating by the second one-way clutch $F_2$ in the foregoing state, the common carrier CR is rotated in the normal direction at an extensively reduced speed while causing the sun gear S to rotate idly in the reverse direction, and the rotation is taken off from the output member (gear) 9. In the second speed state, the second brake $B_2$ is actuated in addition to the connection of the first clutch $C_1$. Then, the sun gear S is stopped from rotating due to actuation of the first one-way clutch $F_1$ according to the brake $B_2$. Accordingly, rotation of the ring $R_1$ from the input member 5 causes the carrier CR to rotate in the normal direction at a reduced speed while causing the ring gear $R_2$ of the dual unit 3 to rotate in the normal direction, and the rotation is taken off as a second speed at the output member 9. In the third speed state, the second (direct) clutch $C_2$ is connected in addition to the connection of the first (forward) clutch $C_1$. Then, rotation of the input member 5 is transmitted to the sun gear S as well as the ring gear $R_1$, and the planetary gear unit 2 is integrally rotated. Accordingly, the carrier CR is integrally rotated and the same speed of rotation as that of the input member 5 is taken off from the output member 9. At this time, if the second brake $B_2$ is disengaged before the direct clutch $C_2$ is connected, the mechanism returns to the first state. In order to avoid the foregoing, the second brake $B_2$ is disengaged after the clutch $C_2$ is connected or otherwise maintained in its engaging state. In the reverse (R) range, the second clutch $C_2$ and the third (1st reverse) brake $B_3$ are actuated. Then, rotation of the input member 5 is transmitted to the sun gear S through the clutch $C_2$. Since the ring gear $R_2$ of the dual unit 3 is fixed in the foregoing state, the carrier CR is also rotated in the reverse direction while causing the ring gear $R_1$ of the single unit 2 to rotate in the reverse direction and the reverse rotation of the carrier is taken off at the output member 9. In the first range, the third brake $B_3$ is actuated in addition to the operation when in the first speed state of the D range. Accordingly, when an engine brake is effected i.e. when the input and output are reversed, although an idle rotation state is created in the D range since the transmission is cut off by the one-way brake $F_2$, the first speed state is maintained since the ring gear $R_2$ is fixed by the brake $B_3$ in 1 range. The first speed of 2 range is equivalent to the first speed of the D range. In second speed, the first brake (2nd coast brake) $B_1$ is actuated in addition to the operation when in the second speed state of the D range. Then, when the engine brake is effected, although an idle rotation state is created by the one-way clutch $F_1$ in the D range, the second speed state is maintained since the sun gear S is fixed by the brake $B_1$ in 2 range. The forward three speed and reverse one speed of the automatic transmission mechanism portion $10_1$ is transmitted to the right and left axles from a differential portion through the annexed transmission part $20_1$ comprising a reduction gear 25.

Next, as shown in FIG. 3, there is a four speed stage automatic transmission $1_2$ comprising an underdrive (U/D) which is a combination of the three speed automatic transmission mechanism portion $10_1$ and the annexed transmission part $20_2$ attached with the sub-transmission unit 22. The automatic transmission $1_2$ is operated according to the operation table shown in FIG. 4. That is, although the three speed automatic transmission mechanism portion $10_1$ is operated in the same manner as the aforementioned three speed stage transmission $1_1$, when in first speed and second speed in the D range, the annexed transmission part $20_2$ is in a state in which the fourth brake $B_4$ and fourth one-way clutch $F_3$ are actuated to stop the sun gear $S_3$. Accordingly, rotation of the counter gear 21 from the automatic transmission mechanism portion $10_1$ is taken off as U/D at the carrier $CR_3$ through the ring gear $R_3$, and a first speed and a second speed which are lower than that of the aforementioned transmission $1_1$ are obtained in total. Then, while keeping the automatic transmission mechanism portion $10_1$ in its second speed state, the fourth brake $B_4$ in the annexed transmission part $20_2$ is released and the fourth clutch $C_3$ is connected. Then, the sun gear S and the carrier $CR_3$ are put together in the planetary gear unit 26, and rotation of the ring gear $R_3$ is taken off from the direct connection at the output pinion 23. Accordingly, a third speed is obtained in total through combination of the two speeds provided by the automatic transmission mechanism portion $10_1$ and the direct connection of the annexed transmission part $20_2$. When the automatic transmission mechanism portion $10_1$ assumes the aforementioned three speed state while maintaining the annexed transmission part $20_2$ in its direct connection state, a fourth speed is obtained in total. The first speed and second speed in 3 range is the same as in the D range, and the third speed is obtained through combination of the three speeds provided by the automatic transmission mechanism portion $10_1$ and U/D of the annexed transmission part $20_2$. Accordingly, in the third speed of D range, since the automatic transmission mechanism portion $10_1$ is in second speed and the one-way clutch $F_1$ is interposed, engine brake is freed and a possible shock at the time of gear shifting can be reduced. On the other hand, in the third speed in 3 range, both the automatic transmission mechanism portion $10_1$ and annexed transmission part $20_2$ are in the connected state and the engine brake is effected. When the U/D reduction gear rate of the sub-transmission unit 22 is large, the reduction gear rate can be made larger than the third speed in D range. In both the D range and 3 range, since no simultaneous shifting is required between the automatic transmission mechanism portion $10_1$ and the annexed transmission part $20_2$, a smooth shift is obtained without a special timing adjusting valve for synchronism. R range, 2 range and 1 range are obtained by combining the U/D state of the annexed transmission part $20_2$ to the R range, 2 range and 1 range of the automatic transmission $10_1$.

As shown in FIG. 5, a four speed stage automatic transmission $1_3$ comprising an overdrive is obtained by combining the four speed automatic transmission mechanism portion $10_2$ and the annexed transmission part $20_1$ comprising a reduction gear 25. Since the operation at the time of R range, 2 range, and speed and two speed in 1 range and D range is the same as that of the aforementioned three speed automatic transmission mechanism $10_1$, description thereof will be omitted. The automatic transmission $1_3$ is operated according to the operation table shown in FIG. 6. That is, in the third speed state in the D range, the third clutch $C_o$ is connected in addition to the connection of the first clutch $C_1$. Then, rotation of the input member 5 is transmitted to the ring gear $R_1$ of the single planetary unit 2 through the clutch $C_1$ and at the same time, to the ring gear $R_2$ of the dual unit 3 through the clutch $C_o$. Accordingly, the respective elements of both the planetary gear units 2 and 3 are integrally rotated and a same speed of rotation as that of the input member 5 is transmitted to the output member 9 from the carrier CR. At this time, the second brake $B_2$ is maintained in the retaining state until the clutch $C_o$ is coupled in order to prevent the transmission from temporarily returning to the first speed state from the second speed state, and in the state that the coupling of the clutch $C_o$ is completed and the planetary units 2 and 3 are integrally rotated, the one-way clutch $F_o$ is rotated synchronously. And, in the fourth speed state, the first clutch $C_1$ is disengaged and the first brake $B_1$ is actuated. Then, rotation of the input member 5 is transmitted to the ring gear $R_2$ of the dual unit 3 through the clutch $C_o$. Since the sun gear S is stopped in the foregoing state, the carrier CR is rotated at a high speed while causing the ring gear $R_1$ to rotate idly at an increased speed, and the high speed rotation is taken off as an overdrive (O/D) at the output member 9. When an up-shift is effected to shift from third speed to fourth speed, based on the constitution that the first clutch $C_1$ is disengaged before the first brake $B_1$ is actuated and the speed of the sun gear S is prevented from being accelerated by the one-way clutch $F_o$, sufficient time is allowed for the retaining operation of the first brake $B_1$ in order to facilitate the operation timing thereof and a smooth shift is obtained by preventing a possible occurrence of a shift shock due to change of grasping. At this time, the second brake $B_2$ and the first one-way clutch $F_1$ may be actuated. Similarly, when a down-shift is effected from fourth speed to third speed, because of the presence of the one-way clutch $F_o$, the sun gear S is prevented from being rotated at a higher speed than the input member 5 due to release of the first brake $B_1$, so that a sufficient time is allowed for the coupling of the first clutch $C_1$ operation timing is facilitated, and the possible occurrence of a shift shock due to change of grasping can be prevented, thus enabling smooth shift to be obtained. The operation in 3 range is the same in first speed, second speed and third speed as in the D range. Rotation of the forward four speed stage due to the four speed automatic transmission mechanism $1_3$ is transmitted to a differential portion through the reduction gear 25.

As shown in FIG. 7, forward five speed stage and forward six speed stage automatic transmissions $1_4$ and $1_5$ are obtained by combination the four speed automatic transmission mechanism portion $10_2$ and the annexed transmission part $20_2$ attached with the sub-transmission unit 22.

The five speed stage automatic transmission $1_4$ is operated according to the operation table shown in FIG. 8. That is, although the four speed automatic transmission $10_2$ is operated in the same manner as mentioned above, when in the first speed and second speed state in D range, the annexed transmission part $20_2$ is in the U/D state due to actuation of the brake $B_4$ and the fourth one-way clutch $F_3$. Accordingly, one speed and two speed comprising a lower speed than the aforementioned transmission $1_3$ are obtained from the transmission $1_4$ as a whole. Then, the annexed transmission part $20_2$ is shifted to direct connection while the automatic transmission mechanism portion $10_2$ is maintained in its second speed state, and a third speed is obtained from the transmission $1_4$ as a whole. When the automatic transmission mechanism portion $10_2$ assumes the direct connection state, i.e., third speed, due to the connection of the first and third clutches $C_1$ and $C_o$ while maintaining the annexed transmission part $20_2$ in its direct connection state, a fourth speed is obtained from the transmission $1_4$ as a whole. Similarly, when the automatic transmission mechanism portion $10_2$ is in fourth speed due to connection of the third clutch $C_o$ and actuation of the first brake $B_1$ while the annexed transmission part $20_2$ is maintained in its direct connection state, a fifth speed is obtained comprising an O/D state from the transmission $1_4$ as a whole. At this time, no simultaneous shifting is effected between the automatic transmission mechanism portion $10_2$ and the annexed transmission part $20_2$, and a smooth shift is obtained without a special timing adjusting valve for synchronism. Since the annexed transmission part $20_2$ is in U/D only when in the first speed and second speed states in which the acceleration performance is required, durability of the bearing is improved. R range, 2 range and 1 range is the same as in the automatic transmission $1_2$ shown in FIGS. 3 and 4. Further, the first speed, second speed and fourth speed in 4 range are the same as the first speed, second speed and fourth speed in D range. In third speed, the annexed transmission part $20_2$ is maintained in the U/D state and the automatic transmission mechanism portion $10_2$ assumes the direct connection, i.e., third speed to obtain a third speed stage comprising a higher reduction gear rate than the third speed of D range.

The six speed stage automatic transmission $1_5$ is operated according to the operation table shown in FIG. 9. That is, in the five speed transmission $1_4$ shown in FIG. 8, a sixth speed stage is obtained by inserting a new transmission stage between the first speed and second speed in D range. The new second speed is obtained by shifting the annexed transmission part $20_2$ to the direct connection from the first speed state of the transmission $1_5$ as a whole comprising first speed state of the automatic transmission mechanism portion $10_2$ and the U/D state of the annexed transmission part $20_2$. The automatic transmission mechanism portion $10_2$ is brought to the second speed state and the annexed transmission part $20_2$ is shifted to the U/D state to obtain a third speed from the transmission $1_5$ as a whole. 5 range is obtained by inserting a new second speed in the same manner as in D range in 4 range of the aforementioned 5 speed stage transmission $1_4$. R range and 1 range are the same as in the aforementioned five speed stage transmission $1_4$. Although the one first speed is the same as in D range in 2 range, the second speed is obtained by actuating the third brake $B_3$ to create an actuating state of engine brake and shifting the annexed transmission part $20_2$ to the direct connection state.

A more specific embodiment of the present invention will be described with reference to FIGS. 10 and 11.

An automatic transmission $1_2$ including a three speed automatic transmission mechanism portion $10_1$, as shown in FIG. 10, includes a torque converter portion 31, a three speed automatic transmission mechanism portion $10_1$, an annexed transmission part $20_2$ and a differential portion 35. These respective portions are disposed in a transaxle housing 36, a transaxle case 37 and a transaxle cover 39 which are attached with one another and integrally formed with respect to one another. The converter portion 31 comprises a torque converter 16 and a lock-up clutch 17 (see FIG. 3) and is adapted to transmit engine torque from a shaft 15 connected to an engine crank shaft to an input shaft 5 disposed within the automatic transmission mechanism portion $10_1$ through oil flow within the torque converter 16 or through the coupling of the lock-up clutch 17. Disposed at an upper portion of the transaxle case 37 is a valve body 46. Disposed at an intermediate portion between the automatic transmission mechanism portion $10_1$ and the torque converter portion 31 is an oil pump 47.

The three speed automatic mechanism portion $10_1$ is provided with a brake portion 49, an output portion 50, a planetary gear unit portion 51 and a clutch portion 6 arranged in this order in the axial direction from an engine output portion toward the outside of the oil pump 47. A hollow shaft 53 is rotatably supported by the input shaft 5. The planetary gear unit portion 51 comprises a single gear unit 2 and a dual gear unit 3. The single gear unit 2 comprises a sun gear $S_1$ formed on the hollow shaft 53, a ring gear $R_1$ and a carrier $CR_1$ supporting a pinion $P_1$ meshing with these gears. The dual unit 3 comprises a sun gear $S_2$ formed on the hollow shaft 53, a ring gear $R_2$, a carrier $CR_2$ carrying a first pinion $P_2$ meshing with the sun gear $S_2$ and a pinion $P_2'$ meshing with the ring gear $R_2$ in such a manner as to mesh with respect each other. And, the sun gears $S_1$ and $S_2$ (hereinafter simply referred to as S) of both the units 2 and 3 are formed of gears having the same number of teeth formed on the hollow shaft 53. The carriers $CR_1$ and $CR_2$ (hereinafter simply referred to as CR) are integrally formed from three sheets of side board. In this embodiment, separate pinions $P_1$ and $P_2$ are employed. Alternatively, an integral long pinion P may be employed as shown in FIG. 1 and FIG. 3. Further, both the sun gears $S_1$ and $S_2$ may be commonly formed. The brake portion 49 is provided with a first one-way clutch $F_1$, a second brake $B_2$ and a first brake $B_1$ arranged in this order from the inner diameter side thereof toward the outer diameter direction. Disposed at a position adjacent to the respective brakes are hydraulic actuators 55 and 56 formed on a case of the oil pump 47 and arranged parallel with respect to each other in the radial direction. The first brake $B_1$ is interposed between a flange portion 53a attached to the front end of the hollow shaft 53 and a pump case 37a integrally formed with the axle case 37. The second brake $B_2$ is disposed between an outer race of the first one-way clutch $F_1$ and the pump case 37a. The first one-way clutch $F_1$ is disposed between the hollow shaft 53 and the second brake $B_2$. On the other hand, the output portion 50 includes a counter drive gear 9 supported by a partition wall 37b formed on the axle case 37 through a bearing 57. The gear 9 is connected to the carrier CR through a spline. The outer race portion of the bearing 57 is non-rotatably fixed to the partition wall 37b and extends outwardly. Disposed between the extended portion and a connecting portion integrally connected to the ring gear $R_2$ is a one-way brake $F_2$. Interposed between the outer periphery of the ring gear $R_2$ and the axle case 37 is a third brake $B_3$. A hydraulic actuator 60 is disposed at one side of the wall surface of the partition wall 37b. A piston of the actuator 60 extends in the axial direction and has a comb tooth shaped portion to control the third brake $B_3$. A return spring is disposed against the comb tooth shaped portion.

The clutch portion 52 includes a first (forward) clutch $C_1$ and a second (direct) clutch $C_2$. These are located at the front end of the automatic transmission mechanism portion $10_1$ and are disposed in the transaxle cover 39 portion. The input shaft 5 is integrally connected at its front end portion with the flange portion 5a. The flange portion 5a is engaged with a movable member 62. The movable member 62 is engaged with a piston member 63. An oil chamber 65 is defined by and between the inner diameter portion of the movable member 62 and the flange portion 5a. The movable member 62 is connected at its outer diameter portion to the flange portion 5a in such a manner as to prevent only a relative rotation therebetween and is disposed opposite to the first clutch with a fine space $d_1$ formed therebetween and consitutes a hydraulic actuator for the first clutch $C_1$. On the other hand, an oil chamber 67 is defined by and between the piston portion 63 and the movable member 62. The reverse surface of the piston portion 63 is disposed opposite to the second clutch $C_2$ with a larger space $d_2$ than the space $d_1$ ($d_1 < d_2$) and constitutes a hydraulic actuator for the second clutch $C_2$. Disposed between the piston member 63 and a ring fixed to the flange connecting portion 5b is a spring 70 biased in its contracted state. The spring 70 constitutes a return spring commonly used for the piston members 62 and 63 of both of the hydraulic actuators. The first clutch $C_1$ is interposed between the internal periphery of the outer diameter side of the flange portion 5a and the outer periphery of the ring gear $R_1$ of the single unit 2. The second clutch $C_2$ is interposed between the internal periphery of the movable member 62 and the flange portion 53b connected to the front end of the hollow shaft 53.

On the other hand, the annexed transmission part $20_2$ includes a counter shaft 71 rotatably supported by the axle case 37. The shaft 71 is provided at its front end portion with a sub-transmission unit 22 comprising a single planetary gear unit 26 for an underdrive (U/D). Connected to and supported by the shaft 71 is a differential drive pinion 23. A counter driven gear 21 meshing with the counter drive gear 9 is rotatably supported on the hollow boss portion 23a of the pinion 23 through a bearing. The planetary gear unit 26 comprises a sun gear $S_3$, a carrier $CR_3$ supporting the pinion $P_3$ and connected to the differential drive pinion 23, and a ring gear $R_3$ integrally connected to the counter driven gear 21. A boss member 76 formed with the sun gear $S_3$ is rotatably supported by the shaft 71. The boss member 76 is connected with a flange portion 76a. Interposed between the front end of the boss member 76 and the connecting member 37c connected to the axle case 37 is a (U/D) one-way brake $F_3$. The flange portion 76a is provided at its outer periphery with a fourth (U/D) brake $B_4$ comprising a band brake. Interposed between the internal periphery of the flange portion 76a and the carrier $CR_3$ of the gear unit 26 is a fourth (U/D direct) clutch $C_3$. The clutch $C_3$ is controlled by a hydraulic actuator 77 formed within the flange portion 76a. A collar side board 79 constituting the carrier $CR_3$ is provided at its inner side with a spring 80 for returning the actuator 77.

The differential portion 35 includes right and left front axles 81l and 81r rotatably supported by the axle case 37, a differential gear unit 82 and a ring gear mount case 83. The mount case 83 is fixed with a ring gear 85 meshing with the differential drive gear 23, and at the same time adapted to support a pinion 86 of the differential gear unit 82 to constitute a differential carrier. The right and left side gears 87l and 87r of the differential gear unit 82 mesh with the differential pinion 86 and are connected to the right and left front axles 81l and 81r.

Since the present embodiment is constituted as described engine torque is transmitted to the input shaft 5 of the three speed automatic transmission mechanism $10_1$ through the torque converter portion 31. At the transmission mechanism portion $10_1$, three forward speeds and one reverse speed are obtained according to actuation of the respective clutches $C_1$, and $C_2$, brakes $B_1$, $B_2$ and $B_3$ and respective one-way clutch $F_1$ and one-way brake $F_2$ according to the operation table shown in FIG. 4. Gear shifted rotation is transmitted from the counter drive gear 9 to the counter driven gear 21 of the annexed transmission part $20_2$. At the annexed transmission part $20_2$, output is shifted by two between the direct connection and U/D according to actuation of the clutch $C_3$, brake $B_4$ and one-way brake $F_3$ according to the operation table shown in FIG. 4. Shifting of the automatic transmission mechanism portion $10_2$ and the annexed transmission part $20_2$ are combined, and in total, a four forward speeds (six speed are obtainable through maximum combination thereof) are obtained. That is, when the automatic transmission mechanism portion $10_1$ is in first speed and second speed, and the annexed transmission part $20_2$ is in the U/D state, first speed and second speed are obtained in total. Then, when the automatic transmission mechanism portion $10_1$ is in second speed, the annexed transmission part $20_2$ is shifted to the direct connection to obtain a third speed in total. And, in the foregoing state, the automatic transmission mechanism portion $10_1$ is shifted to third speed to obtain a fourth speed in total. The forward four speed rotation is transmitted from the differential drive pinion 23 to the ring gear 85 of the differential portion 35 and further to the right and left front axles $81l$ and $81r$ through the differential gear unit 82 to drive the front wheels.

In the above-mentioned embodiment, the annexed transmission part $20_2$ is provided with the sub-transmission unit 22 for direct connection and U/D shifting. However, this sub-transmission unit 22 may be removed and as shown in FIG. 1, the annexed transmission part $20_1$ may be formed as a simple reduction gear 25 (21, 23), so that a three speed stage automatic transmission $1_1$ can be obtained with ease.

Next, there will be described an automatic transmission $1_4$ ($1_5$) including a four speed automatic transmission mechanism portion $10_2$ with reference to FIG. 11. Since this automatic transmission is substantially the same as the one described in the above embodiment except for a clutch portion of the automatic transmission mechanism portion, identical reference numerals will be used for identical parts throughout and description thereof will be omitted.

The automatic transmission $1_4$ ($1_5$) includes a four speed automatic transmission mechanism portion $10_2$. The transmission mechanism portion $10_2$ includes a clutch portion $6'$ at its front end portion, that is, the portion covered with a transaxle cover $39'$. The clutch portion $6'$ is provided with a third clutch $C_o$ disposed parallel to the first clutch $C_1$ in the axial direction. Disposed between a return spring 70 and a flange portion $53b$ is a one-way clutch $F_o$. Accordingly, since the third clutch $C_o$ and the one-way clutch $F_o$ are positioned at different locations in the radial direction, the transmission is longer than the three speed automatic transmission mechanism portion $10_1$ by a substantially wide length of the clutch $C_o$ extending in the axial direction. Although the constitution of the first clutch $C_1$, second clutch $C_2$, and the hydraulic actuators 62 and 63 thereof is substantially the same as in the aforementioned three speed automatic transmission mechanism portion $10_1$, they are different in that a ring gear $R_1$ engaged with the first clutch $C_1$ is engaged through a connecting member 92, a collar portion of a flange portion $53b$ engaged with the second clutch $C_2$ is long in the axial direction, and that a flange portion $5a$ connected to the front end of an input shaft 5 is long in the axial direction. The flange portion $5a$ is provided at its outer periphery with a cylindrical movable member 93. The internal peripheral surface of one end of the movable member 93 is oiltight with a reaction member 95 engaged with the flange portion $5a$ and constitutes an actuator for a third clutch $C_o$ including an oil chamber 96. The movable member 93 is provided at its front end with a tongue member 99 abuttable against the third clutch $C_o$, hanging down in the inner diameter direction and fixed thereto. Disposed between the other end of the movable member 93 and a ring fixed to the flange portion $5a$ is a return spring 100 biased in its contracted state.

Since this embodiment is constituted as mentioned above, rotation of the input shaft 5 transmitted through the torque converter portion 31 enables four forward speeds and one reverse speed at the four speed automatic transmission mechanism portion $10_2$ based on operation of the respective clutches $C_1$, $C_2$ and $C_o$, respective brakes $B_1$, $B_2$ and $B_3$, and respective one-way clutches and one-way brake $F_1$, $F_2$ and $F_o$ according to the operation table shown in FIG. 8 or 9 as mentioned before. The shifting rotation is shifted to the direct connection and U/D at the annexed transmission part $20_2$ based on operation of a clutch $C_3$, a brake $B_4$ and a one-way brake $F_3$ according to the operation table shown in FIG. 8 or 9. Combination of these respective shifting elements of the automatic transmission mechanism portion $10_2$ and annexed transmission part $20_2$ enables a forward five speed stage ($1_4$) or a forward six speed stage ($1_5$) (eight speeds are obtainable through maximum combination) to be obtained from the transmission as a whole. That is, the first speed of the four speed automatic transmission mechanism portion $10_2$ and the U/D of the annexed transmission part $20_2$ are combined to obtain a first speed in total, then a second speed is obtained in total by shifting the annexed transmission part $20_2$ to the direct connection while maintaining the mechanism portion $10_2$ in first speed, then, a third speed is obtained in total by shifting the mechanism portion $10_2$ to second speed and shifting the annexed transmission part $20_2$ to U/D, then, a fourth speed is obtained in total by shifting only the annexed transmission part $20_2$ to the direct connection, and in the foregoing direct connection state, a fifth speed and a sixth speed are obtained in total by shifting the automatic transmission mechanism portion $10_2$ to third speed and fourth speed. In this way, a forward six speed stage automatic transmission $1_5$ is obtained. Alternatively, a forward five speed stage automatic transmission $1_4$ is obtainable from an automatic transmission $1_5$ by canceling the second speed state wherein the automatic transmission mechanism portion $10_2$ is in first speed and the annexed transmission part $20_2$ in direct connection.

In the above embodiment, the annexed transmission part $20_2$ is provided with the sub-transmission unit 22. Alternatively, the sub-transmission may be removed, and as shown in FIG. 5, the annexed transmission part $20_1$ may be formed as a simple reduction gear 25, so that a four speed stage automatic transmission $1_3$ including O/D can be obtained with ease.

And, at the final stage of assembly of the three speed or four speed transmission mechanism portions $10_1$ and $10_2$, the clutch portions 6, $6'$ with or without the clutch and the third one-way clutch $F_o$ are assembled. The clutch portion is disposed in and covered with a different transaxle cover 39 or $39'$ depending whether three or four speeds are desired. The annexed transmission parts $20_1$ and $20_2$ are either attached with the sub-transmission unit 22 comprising U/D mechanism, etc. or have only a simple reduction gear, etc. In this way, a various mode of multi-stage automatic transmission is obtainable through various combinations without altering the transaxle case 37. Accordingly, the aforementioned various kinds of automatic transmissions $1_1$ through $1_5$ are mostly comprised of common parts including the transaxle case 37 and transaxle housing 36. Similarly, the annexed transmission parts $20_1$ and $20_2$ are mostly comprised of common parts including the attachment or detachment of the sub-transmission unit 22. They can be assembled by generally using the same equipment and the same line. Various kinds of automatic transmissions can be easily manufactured by slightly modifying the transaxle covers 39 and 39', clutch portions 6 and 6', and annexed transmission part 20.

The effects of the aforementioned respective embodiments will be summarized as follows. If the automatic transmission $1_1$ is constituted such that the automatic transmission mechanism portion $10_1$ comprising a forward three speed transmission stage is combined with the annexed transmission part $20_1$ without the attachment of the sub-transmission unit 22, the resulting transmission mechanism is short and light.

Furthermore, if the automatic transmission $1_2$ is constituted such that the automatic transmission mechanism portion $10_1$ comprising a forward three speed transmission stage is combined with the annexed transmission part $20_2$ attached with the sub-transmission unit 22, a forward four speed transmission which is short and compact is obtained.

Furthermore, if the automatic transmission $1_3$ is constituted such that the automatic transmission mechanism portion $10_2$ comprising a forward four speed transmission stage is combined with the annexed transmission part $20_1$ without the attachment of the sub-transmission unit 22, a forward four speed transmission which is light is obtained, since only two planetary gear units are required.

Furthermore, if the automatic transmission $1_4$ and $1_5$ are constituted such that the automatic transmission mechanism portion $10_2$ comprising a forward four speed transmission stage is combined with the annexed transmission part $20_2$ with attachment of the sub-transmission unit 22, a multitransmission stage of a five speed, a six speed or even a higher speed can be obtained. Particularly, in the five speed mechanism no simultaneous shifting between the automatic transmission mechanism portion $10_2$ and the annexed transmission part $20_2$ is required and hydraulic controlling is not complex, thus enabling to obtain a smooth shifting.

Particularly, the clutch portions 6 and 6' are disposed in the transaxle covers 39 and 39' portion without altering the transaxle case 37. Accordingly, the transaxle case which is large can be commonly used, and "many kinds and small quantity production" according to the requirements of various kinds of vehicles can be handled without a significant increase of cost.

Although the present invention has been described with reference to the preferred embodiment, the embodiment described herein is for illustrative purposes only and not in limitation thereof. Also, the scope of the present invention is defined in the appended claims and will not be bound by description of the embodiment. Accordingly, it will be understood that all changes and modifications which belong to the appended claims fall within the true spirit and scope of the present invention.

What is claimed is:

1. An automatic transmission comprising:
an automatic transmission mechanism portion comprising a single planetary gear unit and a dual planetary gear unit;
carriers of both of said planetary gear units that are integral with one another;
an input means for inputting torque to the automatic transmission mechanism, a plurality of clutches for operatively connecting predetermined ones of planetary gear elements of both of said planetary gear units to said input means, and braking means for restricting the rotation of predetermined ones of planetary gear elements of both of said planetary gear units,
said plurality of clutches being disposed adjacent one another at an end portion of the transmission for defining a clutch portion of the transmission;
a first clutch portion which is attachable to the automatic transmission mechanism portion for comprising said clutch portion when attached thereto;
a second clutch portion that is attachable to the automatic transmission mechanism portion in place of said first clutch portion for comprising said clutch portion when so attached;
said first clutch portion comprising first clutch for operatively connecting said input means to a ring gear of said single planetary gear unit and a second clutch for operatively connecting said input means to a sun gear of the automatic transmission mechanism portion;
said second clutch portion comprising a said first clutch, a said second clutch, and a third clutch for operatively connecting said input member to a ring gear of said dual planetary gear unit;
an output member of the automatic transmission mechanism portion;
an annexed transmission part adjacent said automatic transmission mechanism portion, said annexed transmission part having a counter gear driven by said output member; and
at last one of a gearing and a sub-transmission unit attached to the annexed transmission part, said sub-transmission unit being selectively attachable to the annexed transmission part.

2. An automatic transmission comprising:
an automatic transmission mechanism portion comprising a single planetary gear unit and a dual planetary gear unit for outputting three forward transmission speeds;
carriers of both of said planetary gear units that are integral with another,
an input means for inputting torque to the automatic transmission mechanism portion, a plurality of clutches operatively connecting predetermined ones of planetary gear elements of both of said planetary gear units to said input means, and braking means for restricting the rotation of predetermined ones of planetary gear elements of both of said planetary gear units;
sun gears of both of said planetary gear units that are integral with one another,
said plurality of clutches being disposed adjacent one another at an end portion of the transmission for constituting an exchangeable clutch portion of the transmission at the end portion thereof,
said clutch portion comprising a first clutch for operatively connecting said input means to a ring gear of said single planetary gear unit and a second clutch for operatively connecting said input means to said sun gears;
said braking means comprising a first brake for directly braking rotation of said sun gears, a second brake and a first one-way clutch for restricting rotation of said sun gears to unidirectional rotation, a third brake for directly braking rotation of a ring gear of said dual planetary gear unit, and a one-way brake for restricting rotation of the ring gear of said dual planetary gear unit to unidirectional rotation;
an output member to which said carriers are connected;

an annexed transmission part adjacent said automatic transmission mechanism portion, said annexed transmission part having a counter gear driven by said output member; and at least one of a gearing and a sub-transmission unit attached to the annexed transmission part, said sub-transmission unit being selectively attachable to the annexed transmission part.

3. An automatic transmission comprising:

an automatic transmission mechanism portion comprising a single planetary gear unit and a dual planetary gear unit for outputting four forward transmission speeds;

carrier of both of said planetary gear units that are integral with one another;

an input means for inputting torque to the automatic transmission portion, a plurality of clutches operatively connecting predetermined ones of planetary gear elements of both of said planetary gear units to said input means, and braking means for restricting the rotation of predetermined ones of planetary gear elements of both of said planetary gear units;

sun gears of both of said planetary gear units that are integral with on another;

said plurality of clutches being disposed adjacent one another at an end portion of the transmission for constituting an exchangeable clutch portion of the transmission at the end portion thereof, said clutch comprising a first clutch for operatively connecting said input means to a ring gear of the single planetary gear unit, a second clutch for operatively connecting said input means to said sun gears, and a third clutch for operatively connecting said input means to a ring gear of the dual planetary gear unit;

said braking means comprising a first brake for directly braking rotation of said sun gears, a second brake and a first one-way clutch for restricting rotation of said sun gears to unidirectional rotation, a third brake for directly braking rotation of the ring gear of the dual planetary gear unit, and a one-way brake for restricting rotation of said ring gear of the dual planetary gear unit to unidirectional rotation;

an output member to which said carriers are connected;

an annexed transmission part adjacent said automatic transmission mechanism portion, said annexed transmission part having a counter gear driven by said output member; and at least one of a gearing and a sub-transmission unit attached to the annexed transmission part, said sub-transmission unit selectively attachable to the annexed transmission part.

4. An automatic transmission as claimed in claim 3, and further comprising a third one way clutch operatively connected between said sun gears and said input means for restricting the rate of rotation of said sun gears to one that is not greater than that of said input means.

5. An automatic transmission as claimed in claim 1, wherein said sub-transmission unit comprises a single planetary gear unit shiftable between a direct connection state and an underdrive state.

6. An automatic transmission mechanism as claimed in claim 1,
wherein said automatic transmission mechanism portion is a forward three speed transmission for inputting three forward transmission speeds to said output member, and only said gearing is attached to the annexed transmission part.

7. An automatic transmission as claimed in claim 1,
wherein said automatic transmission mechanism portion is a forward three speed transmission stage for inputting three forward transmission speeds to said output member, and said sub-transmission unit is attached to the annexed transmission part.

8. An automatic transmission mechanism as claimed in claim 1,
wherein said automatic transmission mechanism portion is a forward four speed transmission stage for inputting four forward transmission speeds to said output member, and only said gearing is attached to the annexed transmission part.

9. An automatic transmission as claimed in claim 1,
wherein said automatic transmission portion is a forward four speed transmission stage for inputting four forward speeds to said output member, and said sub-transmission unit is attached to the annexed transmission part.

10. An automatic transmission comprising:

an automatic transmission mechanism portion comprising a single planetary gear unit and a dual planetary gear unit;

carriers of both of said planetary gear units that are integral with one another;

an input means for inputting torque to the automatic transmission mechanism, a plurality of clutches for operatively connecting predetermined ones of planetary gear elements of both of said planetary gear units to said input means, and braking means for restricting the rotation of predetermined ones of planetary gear elements of both of said planetary gear units, said plurality of clutches being disposed adjacent one another at an end portion of the transmission for defining a clutch portion of the transmission;

a first clutch portion which is attachable to the automatic transmission mechanism portion for comprising said clutch portion when attached thereto;

a second clutch portion that is attachable to the automatic transmission mechanism portion in place of said first clutch portion for comprising said clutch portion when so attached;

said first clutch portion comprising a first clutch for operatively connecting said input means to a ring gear of said single planetary gear unit and a second clutch for operatively connecting said input means to a sun gear of the automatic transmission mechanism portion;

said second clutchh portion comprising a said first clutch, a said second clutch, and a third clutch for operatively connecting said input member to a ring gear of said dual planetary gear unit;

an output member of the automatic transmission mechanism portion;

an annexed transmission part adjacent said automatic transmission portion, said annexed transmission part having a counter gear driven by said output member;

at least one of a gearing and a sub-transmission unit attached to the annexed transmission part, said sub-transmission unit being selectively attachable to the annexed transmission part;

a transaxle case in which said automatic transmission mechanism is disposed; and a transaxle cover portion attached to said transaxle case, said clutch portion being disposed in said transaxle cover portion, whereby modification of said transaxle case is not required when either of said first and said second clutch portions is to be attached to the automatic transmission mechanism portion.

* * * * *